United States Patent
Lee et al.

(10) Patent No.: US 10,401,484 B2
(45) Date of Patent: Sep. 3, 2019

(54) LIDAR SENSOR ALIGNMENT SYSTEM

(71) Applicant: Aptiv Technologies Limited, St. Michael (BB)

(72) Inventors: Jong Ho Lee, Pittsburgh, PA (US); Junsung Kim, Pittsburgh, PA (US)

(73) Assignee: Aptiv Technologies Limited, St. Michael (BB)

( * ) Notice: Subject to any disclaimer, the term of this patent is extended or adjusted under 35 U.S.C. 154(b) by 77 days.

(21) Appl. No.: 15/638,538

(22) Filed: Jun. 30, 2017

(65) Prior Publication Data
US 2019/0004159 A1    Jan. 3, 2019

(51) Int. Cl.
G01S 17/02 (2006.01)
G01S 7/497 (2006.01)
G01S 17/93 (2006.01)
G01S 7/40 (2006.01)

(52) U.S. Cl.
CPC .......... *G01S 7/4972* (2013.01); *G01S 7/4026* (2013.01); *G01S 17/023* (2013.01); *G01S 17/936* (2013.01)

(58) Field of Classification Search
CPC .... G01S 17/936; G01S 7/4972; G01S 17/023; G01S 7/4026
See application file for complete search history.

(56) References Cited

U.S. PATENT DOCUMENTS

| | | | |
|---|---|---|---|
| 5,617,085 A | 4/1997 | Tsutsumi et al. | |
| 2010/0063648 A1* | 3/2010 | Anderson | G06N 5/043 701/1 |
| 2010/0157280 A1 | 6/2010 | Kusevic et al. | |

FOREIGN PATENT DOCUMENTS

| | | | | |
|---|---|---|---|---|
| DE | 102011120535 | | 6/2013 | |
| DE | 102011120535 A1 | * | 6/2013 | ........... G01S 7/4972 |

OTHER PUBLICATIONS

Florentine et al., "Pedestrian notification methods in autonomous vehicles for multi-class mobility-on-demand service." Proceedings of the Fourth International Conference on Human Agent Interaction, Oct. 4, 2016, pp. 387-392.
Pendleton et al., "Autonomous golf cars for public trial of mobility-on-demand service." Intelligent Robots and Systems (IROS), 2015 IEEE/RSJ International Conference on Sep. 28, 2018, pp. 1164-1171.
European Extended Search Report in European Application No. 18180306.5, dated Nov. 16, 2018, 7 pages.

* cited by examiner

*Primary Examiner* — Siamak Harandi
(74) *Attorney, Agent, or Firm* — Fish & Richardson P.C.

(57) ABSTRACT

A Light Detection and Ranging (LiDAR) sensor alignment system includes an imaging device, a LiDAR sensor, a mount device, and a controller. The imaging device is configured to output an image signal associated with a first scene that includes an object. The LiDAR sensor is configured to output a LiDAR signal associated with a second scene. The mount device is attached to the LiDAR sensor and adapted to align the LiDAR sensor. The controller is configured to receive the image and LiDAR signals, classify the object from the first scene, and confirm the object is properly oriented within the second scene. If the object is not properly orientated within the second scene, the controller initiates an action.

8 Claims, 2 Drawing Sheets

LIDAR SENSOR ALIGNMENT SYSTEM

BACKGROUND OF THE INVENTION

The present disclosure relates to a Light Detection and Ranging (LiDAR) sensor alignment system, and more particularly, to a LiDAR sensor alignment system of a tracking system for automated vehicles.

The operation of modern vehicles is becoming increasingly autonomous, causing a decrease in driver intervention. The various control features are becoming increasingly complex while vehicle accuracy, efficiency, and reliability must be at least maintained. The complex nature of such automated systems may require a large number of sensors. Such sensors may become misaligned. If not corrected, such misalignment may degrade optimal vehicle performance.

SUMMARY OF THE INVENTION

In one, non-limiting, exemplary embodiment of the present disclosure, a Light Detection and Ranging (LiDAR) sensor alignment system includes an imaging device, a LiDAR sensor, a mount device, and a controller. The imaging device is configured to output an image signal associated with a first scene that includes an object. The LiDAR sensor is configured to output a LiDAR signal associated with a second scene. The mount device is attached to the LiDAR sensor and adapted to align the LiDAR sensor. The controller is configured to receive the image and LiDAR signals, classify the object from the first scene, and confirm the object is properly oriented within the second scene. If the object is not properly orientated within the second scene, the controller initiates an action.

In another, non-limiting, embodiment, an automated vehicle includes a controller, an imaging device, a LiDAR sensor, a vehicle body, a mount device, and a controller. The controller includes a processor and an electronic storage medium. The imaging device is configured to output an image signal associated with a first scene including an object. The LiDAR sensor is configured to output a LiDAR signal associated with a second scene. The mount device is attached to the LiDAR sensor and the vehicle body, and is constructed and arranged to move the LiDAR sensor with respect to the vehicle body to align the LiDAR sensor. The controller is configured to receive the image and LiDAR signals, classify the object from the first scene, and confirm the object is properly oriented within the second scene. If the object is not properly orientated within the second scene the controller initiates an action.

In another, non-limiting, embodiment, a computer software product is executed by a controller of an automated vehicle that includes an imaging device. The imaging device is configured to output an image signal associated with a first scene including an object. The LiDAR sensor is configured to output a LiDAR signal associated with a second scene. The computer software product includes an image module, a classification module, a LiDAR module, and a comparison module. The image module is configured to receive and process the image signal to produce a first scene associated with the image signal. The classification module is configured to recognize and classify an object in the first scene. The LiDAR module is configured to receive and process the LiDAR signal to produce a second scene associated with the LiDAR signal. The comparison module is configured to compare the first and second scenes to confirm the object is properly oriented within the second scene.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
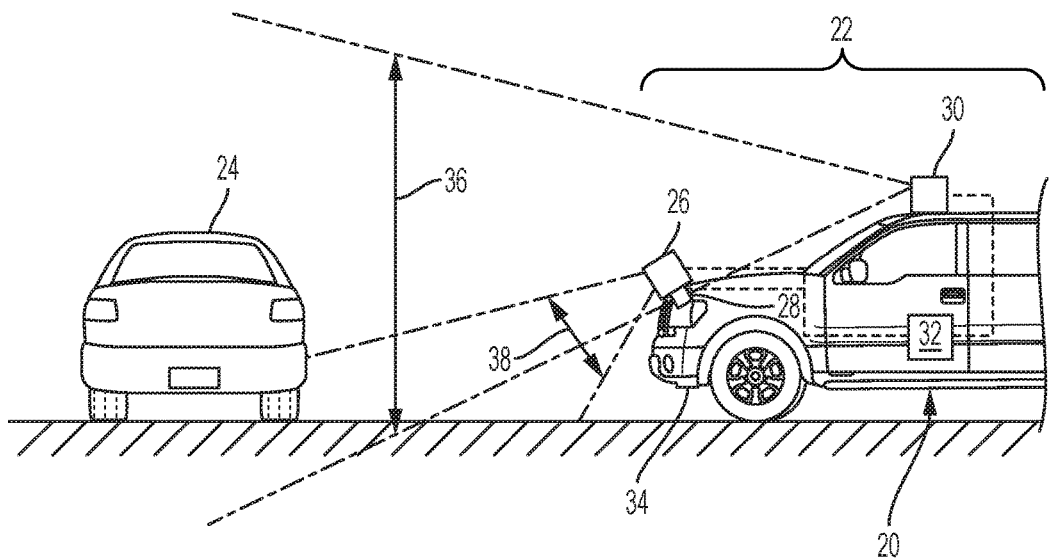
FIG. 1 is a side view of a host vehicle having a LiDAR sensor alignment system with a LiDAR sensor of the system being misaligned.

FIG. 1 illustrates a non-limiting example of a semi-autonomous or autonomous vehicle 20 (hereafter termed automated or host vehicle) that may include various systems and components that may contribute toward partial or full automated operation of the host vehicle 20. The various components and/or systems may control the speed, direction (e.g., steering), brakes and other aspects of the vehicle operation necessary for the host vehicle 20 to, for example, generally travel along a roadway. Such vehicle travel may be without the interaction of an occupant (not shown) within the host vehicle 20.

An object 24, which may be another vehicle, is generally located forward of the host vehicle 20. The various components and/or systems of the host vehicle 20, which contribute toward automated operational aspects of the host vehicle, may generally detect, sense, and/or image the vehicle 24 in order to affect a desired response by the host vehicle 20.

Figure 2:
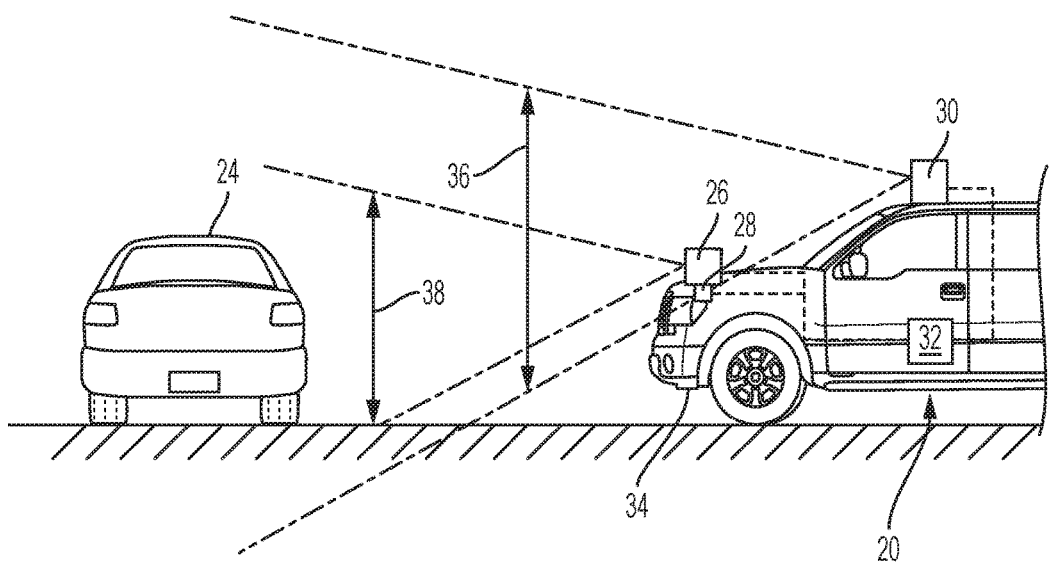
FIG. 2 is a side view of the host vehicle with the LiDAR sensor being aligned.

The host vehicle 20 includes a Light Detection and Ranging (LiDAR) sensor alignment system 22. The LiDAR sensor alignment system 22 may include a LiDAR sensor 26, a mount device 28, an imaging device 30, and a controller 32. In FIG. 1, the LiDAR sensor 26 is depicted in a misaligned position capable of sensing only a portion, or none, of the object 24. In FIG. 2, the LiDAR sensor 26 is depicted in an aligned position capable of sensing the entire object 24. The mount device 28 may be attached to, and may extend between, the LiDAR sensor 26 and a body 34 of the host vehicle 20. The mount device 28 may be adapted to adjust the positioning of the LiDAR sensor 26. In one embodiment, this adjustment may be conducted manually, and in another embodiment, the mount device 28 may include an electric alignment drive or motor constructed to automatically align the LiDAR sensor 26 via a command from the controller 32.

The imaging device 30 may be a camera, and is adapted to sense a scene (see arrow 36). The scene 36 may generally be a field of view, and in FIGS. 1 and 2 is generally aligned to view the entire object 24. The LiDAR sensor 26 is adapted to sense a scene (see arrow 38), and may generally be a field of view. In FIG. 1, the LiDAR sensor 26 is shown out of alignment and may have been physically knocked or displaced. Because the LiDAR sensor 26 is in the misaligned position, the scene 38 may not depict the complete object 24. In FIG. 2, the LiDAR sensor 26 is aligned and the scene 38 includes, or encompasses, the complete object 24. In one example, the scene 36 generally depicted by the imaging device 30 may be much larger than the scene 38 sensed by the LiDAR sensor 26.

Figure 3:
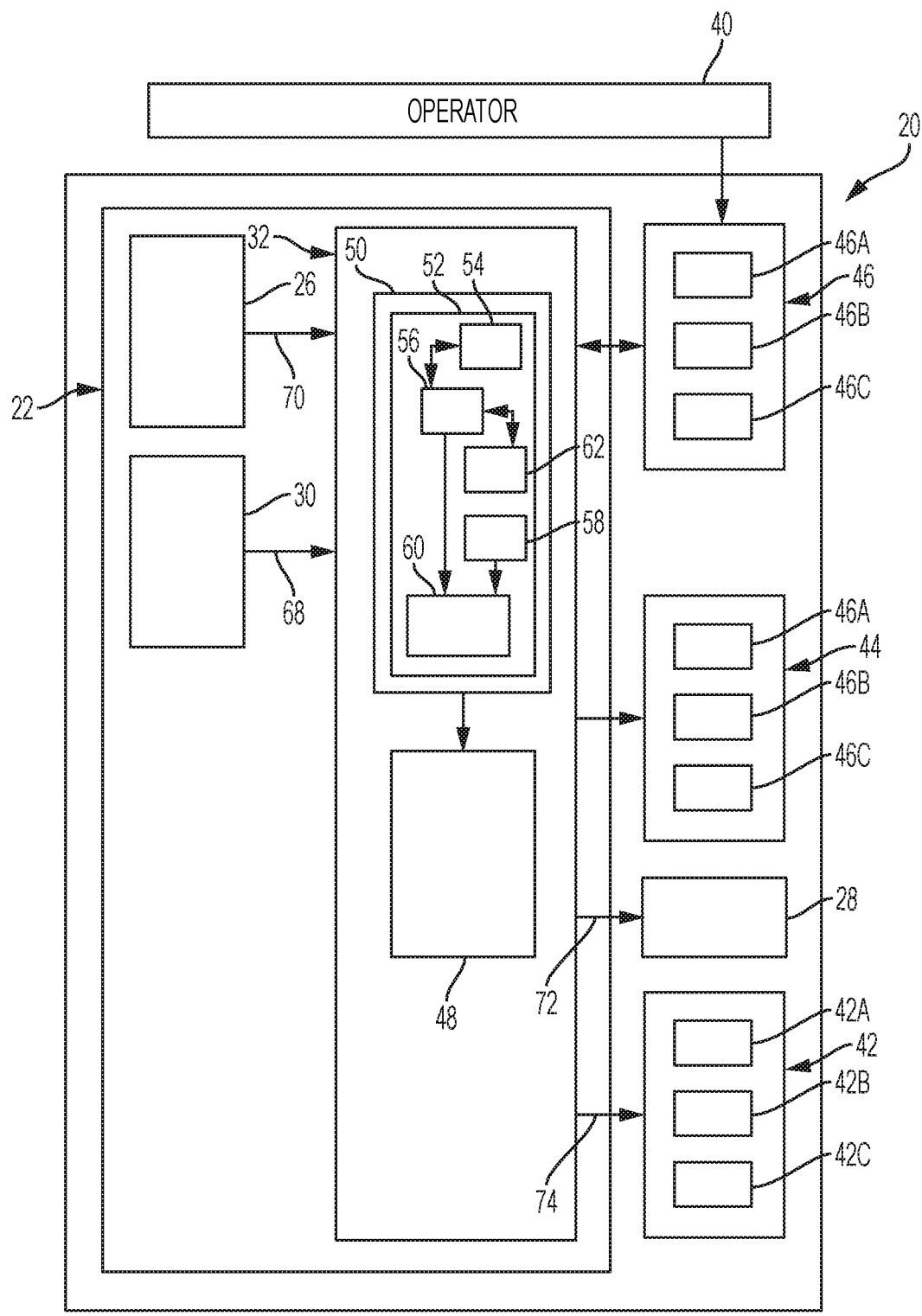
FIG. 3 is a schematic of the host vehicle with the LiDAR sensor alignment system.

Referring to FIGS. 1 and 3, and as previously stated, the host vehicle 20 may be semi-autonomous or fully autonomous. Various components of the LiDAR sensor alignment system 22 may generally serve at least two functions. For example, the LiDAR sensor 26 and the imaging device 30 may serve a primary function of detecting the presence of objects in the path of the moving host vehicle 20. Such detection may be processed by the controller 32, which may then initiate various commands to automatically produce an appropriate response by the host vehicle 20.

In the example of a semi-autonomous host vehicle 20, the host vehicle may be typically driven by an operator 40. In this case, an automation system (not shown) may provide assistance to the operator 40. this assistance may be the mere activation of a warning device 42 (see FIG. 3), or may include activating a control override unit 44 that temporarily takes over the control of manual controls 46 that are typically used by the operator 40. Such manual controls 46 may include a directional unit 46A (e.g., steering unit), an acceleration unit 46B, and a braking unit 46C of the host vehicle 20. The waring device 62 may include, or may be, an audible device 42A, a visual device 42B, and/or a haptic device 42C. In the example of a fully autonomous, host, vehicle 20, the automation system may simply command the controls 46 continuously, without significant operator intervention.

Referring to FIG. 3, LiDAR sensor alignment system 22 may further include the warning device 42. The controller 32 may include a processor 48 and an electronic storage medium 50. The processor 48 may be a microprocessor or other control circuitry such as analog and/or digital control circuitry including an application specific integrated circuit (ASIC) for processing data as is known by one with skill in the art. The storage medium 50 of the controller 32 may be non-volatile memory, such as electrically erasable programmable read-only memory (EEPROM) for storing one or more routines, thresholds, and captured data, hereafter referred to as an application 52 (e.g., a computer software product). The application 52 may be executed by the processor 48 of the controller 32 to at least recognize when the LiDAR sensor 26 is out of alignment.

The LiDAR sensor 26 is generally known to one having skill in the art, and when in an aligned position, is configured to at least assist in the detection and monitoring of the object 24. More specifically, the LiDAR sensor 26 may include a large array of individual light or laser beams that are pulsed at a predetermined frequency. Sensor(s) included as part of the LiDAR sensor 26 are configured to detect the reflected, or returned, light. The time between the initial pulsing of the light and the sensed light return is used to calculate the distance of the reflecting object surface. The rapid pulsing of the LiDAR sensor 26 and the information obtained can be processed to determine movement of the detected object 24.

The LiDAR sensor 26 may be mounted, via the mount device 28, to the vehicle body 34 and toward the front of the host vehicle 20. Alternatively, the LiDAR sensor 26 may be a plurality of LiDAR sensors with each sensor mounted proximate to a respective corner (not shown) of the host vehicle 20. In yet another example, the LiDAR sensor 26 may include the capability of rotating at a known frequency to capture a three-hundred and sixty degree scene.

The application 50 may include an image module 54, a classification module 56, a LiDAR module 58, a comparison module 60, and a database 62. The image module 54 is configured to receive an image signal (see arrow 68) from the imaging device 30, and processes the image signal 68 to generally reproduce the scene 36. The classification module 56 may be configured to identify, recognize and/or classify an object in the scene 36. To assist in this classification, the classification module 56 may utilize the preprogrammed database 62 that may include data/information relative to a large array of different types of objects.

The LiDAR module 58 is configured to receive a LiDAR signal (see arrow 70) from the LiDAR sensor 26, and processes the LiDAR signal 70 to generally produce the sensed scene 38. The comparison module 60 may be configured to receive the scenes 36, 38, and determine if the object 24 that is in scene 36 is in scene 38. If not, or if only partially in the scene 38, the comparison module 60 may determine that the LiDAR sensor 26 is misaligned.

Referring to FIGS. 1 and 3, and in operation of the LiDAR sensor alignment system 22, the system may initiate execution of the application 52 automatically and periodically to verify alignment of the LiDAR sensor 26. In another embodiment, the system 22 may be operated via a request by, for example, a vehicle technician. Regardless of how execution of application 52 is initiated, the imaging device 30 images a scene 36 that may contain the object 24 and sends an image signal 68 to the controller 32 for processing by the image module 54. Similarly, the LiDAR sensor 26 generally monitors a scene 38 and sends a LiDAR signal 70 to the controller 32 for processing by the LiDAR module 58. In one example, the object 24 may be a vehicle. It is further contemplated and understood that the object 24 may be any object chosen by the system 22 as, for example, a reference point.

The scene 36 is then generally processed by the classification module 56 to determine and/or classify an object 24. Scene 36 with object 24 and scene 38 are then sent to the comparison module 60 to determine if the object 24 is also properly located in scene 38. If not, the comparison module 60 may determine that the LiDAR sensor is misaligned.

If misaligned, the controller 32 may initiate an action by sending a command signal (see arrow 72) to the mount device 28 that causes the mount device to realign the LiDAR sensor 26 by a magnitude and direction that may be determined by the comparison module 60. In another embodiment, a command signal (see arrow 74) may be sent to the warning device 42, as the action, to notify an operator 40 of the misalignment.

Accordingly, the LiDAR sensor alignment system 22 for automated operation of the host vehicle 20 advances the automated vehicle arts by enabling a system, application, or controller to perform self-diagnostics thereby improving overall vehicle accuracy, efficiency, and reliability.

The various functions described above may be implemented or supported by a computer program that is formed from computer readable program codes, and that is embodied in a computer readable medium. Computer readable program codes may include source codes, object codes, executable codes, and others. Computer readable mediums may be any type of media capable of being accessed by a computer, and may include Read Only Memory (ROM), Random Access Memory (RAM), a hard disk drive, a compact disc (CD), a digital video disc (DVD), or other forms.

Terms used herein such as component, application, module, system, and the like are intended to refer to a computer-related entity, either hardware, a combination of hardware and software, or software execution. By way of example, an application may be, but is not limited to, a process running on a processor, a processor, an object, an executable, a thread of execution, a program, and/or a computer. It is understood that an application running on a server and the server, may be a component. One or more applications may reside within a process and/or thread of execution and an application may be localized on one computer and/or distributed between two or more computers While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A Light Detection and Ranging (LiDAR) sensor alignment system comprising:
   an imaging device configured to output an image signal associated with a first scene including an object;
   a LiDAR sensor configured to output a LiDAR signal associated with a second scene;
   a mount device attached to the LiDAR sensor and constructed and arranged to align the LiDAR sensor; and
   a controller configured to:
      receive the image signal and LiDAR signals;
      use the image signal to classify the object from the first scene using a database including preprogrammed information associated with the object and applied by the controller for classification of the object;
      use the classified object and the LiDAR signals to confirm the classified object is at least partially within the second scene; and
      in accordance with the classified object not being at least partially within the second scene, initiating an action.

2. The LiDAR sensor alignment system set forth in claim 1, wherein the mount device includes an electric alignment drive constructed and arranged to be controlled by the controller for aligning the LiDAR sensor as the action.

3. The LiDAR sensor alignment system set forth in claim 1, further comprising:
   a warning device configured to receive an initiation signal from the controller as the action if the object is not at least partially within the second scene.

4. The LiDAR sensor alignment system set forth in claim 1, wherein the controller includes a processor and an electronic storage medium for executing a software-based application configured to determine if the object is not at least partially within the second scene.

5. An automated vehicle comprising:
   an imaging device configured to output an image signal associated with a first scene including an object;
   a Light Detection and Ranging (LiDAR) sensor configured to output a LiDAR signal associated with a second scene;
   a vehicle body;
   a mount device attached to the LiDAR sensor and the vehicle body, and constructed and arranged to move the LiDAR sensor with respect to the vehicle body thereby aligning the LiDAR sensor; and
   a controller configured to:
      receive the image signal and LiDAR signals;
      utilize the image signal to classify the object from the first scene using a database including preprogrammed information associated with the object and applied by the controller for classification of the object; and
      utilize the classified object and the LiDAR signals to confirm the classified object is at least partially within the second scene; and
      in accordance with the classified object not being at least partially within the second scene, initiating an action.

6. The automated vehicle set forth in claim 5, wherein the mount device includes an electric alignment drive constructed and arranged to be controlled by the controller for aligning the LiDAR sensor.

7. The automated vehicle set forth in claim 5, further comprising:
   a warning device configured to receive an initiation signal from the controller if the object is not at least partially within the second scene.

8. A non-transitory, computer-readable storage medium having instructions stored thereon, that when executed by a controller of an automated vehicle, cause the controller to perform operations comprising:
   receiving an image signal from an imaging device and Light Detection and Ranging (LiDAR) signals from a LiDAR sensor;
   utilizing the image signal to classify an object from a first scene captured by the imaging device using a database including preprogrammed information associated with the object for classification of the object;
   utilizing the classified object and the LiDAR signals to confirm the classified object is at least partially within a second scene captured by the LiDAR sensor; and
   in accordance with the classified object not being at least partially within the second scene, initiating an action.

* * * * *